United States Patent
Lai et al.

(10) Patent No.: US 9,158,341 B2
(45) Date of Patent: Oct. 13, 2015

(54) PORTABLE COMPUTER

(71) Applicant: Wistron Corporation, New Taipei (TW)

(72) Inventors: Yen-Chang Lai, New Taipei (TW);
Shang-Mao Lee, New Taipei (TW);
Chun-Chien Chen, New Taipei (TW);
Hung-Chih Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 181 days.

(21) Appl. No.: 13/916,894

(22) Filed: Jun. 13, 2013

(65) Prior Publication Data
US 2014/0043746 A1    Feb. 13, 2014

(30) Foreign Application Priority Data
Aug. 7, 2012    (TW) .............................. 101128468 A

(51) Int. Cl.
*G06F 1/16*    (2006.01)
(52) U.S. Cl.
CPC ............ *G06F 1/1669* (2013.01); *G06F 1/1624* (2013.01)
(58) Field of Classification Search
CPC .............................. G06F 1/1681; G06F 1/1616
USPC .................................................. 361/679–687
See application file for complete search history.

(56) References Cited

U.S. PATENT DOCUMENTS

| 5,706,167 A |   | 1/1998 | Lee |
|---|---|---|---|
| 5,734,548 A | * | 3/1998 | Park .......................... 361/679.14 |
| 7,184,263 B1 | * | 2/2007 | Maskatia ................. 361/679.27 |
| 2004/0052044 A1 | * | 3/2004 | Mochizuki et al. ........... 361/683 |

FOREIGN PATENT DOCUMENTS

| TW |   | 566583 | 12/2003 |
|---|---|---|---|
| TW |   | 584227 | 11/2004 |
| TW | M430814 | U1 | 6/2012 |

* cited by examiner

*Primary Examiner* — Tuan T Dinh
*Assistant Examiner* — Rockshana Chowdhury
(74) *Attorney, Agent, or Firm* — Muncy, Geissler, Olds & Lowe, P.C.

(57) ABSTRACT

A portable computer includes a base, a keyboard module, a pushing assembly, a display module, and a sliding assembly. The base includes a front end and a rear end. The keyboard module includes two keyboard portions; each keyboard portion is moveably combined with the base by at least one moving structure. The pushing assembly includes two pushing elements combined moveably with the base. The display module includes a connecting end and a support portion. The sliding assembly includes a slide corresponding element disposed in the base and a sliding element pivoted on the connecting end and moved along the slide corresponding element. When the connecting end moves towards the front end with the slide element, the pushing assembly pushes and moves the moving structures by the slide element, and the two keyboard portions are separated; then the connecting end is moved through the keyboard module with the slide element.

14 Claims, 15 Drawing Sheets

PORTABLE COMPUTER

BACKGROUND OF THE INVENTION

1. Field of the Invention

The present invention relates to a portable computer, and more particularly, to a portable computer combined with a detachable keyboard module to facilitate the adjustment of a position of a display screen.

2. Description of the Related Art

Computing devices have become an indispensable part of our daily life. With the fast development of touch technologies, most hand-held devices or electronic devices such as tablet PCs, smart phones, and PDAs now provide touch panels instead of mouse or keyboard as input devices. These devices are equipped with operating systems supporting touch functions to enable intuitive and convenient operation.

The notebook computer, however, is equipped with a QWERTY keyboard and an input device such as a touch pad, and the operating system previously installed on the notebook may not support touch input function or may not be designed for touch in terms of the operation interface design. Therefore, traditionally pure notebooks rarely have touch requirements or touch design. However, operating system vendors have designed operating systems for laptops allowing touch control of the operating system. On the other hand, consumer demand for the touch operation by a tablet computer or smartphone is also growing; therefore, the demand for a notebook that can be transformed into a tablet computer exists. In order to facilitate a display screen to rotate and transform relative to the notebook computer itself, in the prior art, a support arm or linked component has been used to support and pivotally connect the notebook with the display screen, which is operated in coordination with the corresponding sliding assembly such that the position of the display screen can be successfully changed.

For example, a portable computer disclosed in Taiwan Patent No. I316666 (U.S. Pat. No. 7,184,263B1) employs a plate supporting to element to support a display screen and provides guide slots in both sides of a keyboard for the bottom of the display screen to slide relative to the computer body, such that the display screen can be disposed upright. In Taiwan Patent No. 566583, a display screen of a notebook can be flipped relative to a base through the design of a plurality of linkage mechanisms in both sides thereof to change the screen display direction.

However, in view of a structure where a display screen rotates relative to a computer body in the aforementioned conventional design, since the computer body is generally provided with a keyboard module, the corresponding sliding elements disposed within the computer body must be away from the keyboard module to work smoothly without interference. Accordingly, such sliding elements are mostly confined at both sides of the keyboard module and must be a paired symmetrical structure, such that the display screen can be moved in a balanced manner. In such design, components that mostly comprise complex linkage mechanisms for pivoting, linkage, and sliding need to be provided and operated to achieve the flip effect, which is less favorable for the assembly and operation of the notebook. Also, since the mechanism may be too complex and supporting and linkage mechanisms may be exposed at both sides thereof, it is not only visually unattractive, but a user's fingers may be accidentally pinched during slide operations. In addition, the supporting mechanisms at both sides need to be considered and kept in a symmetric steady state while the display screen is sliding and moving, for the uneven force on the two sides may cause it not to slide smoothly due to resistance. Furthermore, once one side is damaged, the display screen cannot be flipped successfully.

Therefore, it is indeed a worthy subject to design a structure of the portable computer that is unobstructed by a keyboard module and to provide a stable slide and flip effect.

SUMMARY OF THE INVENTION

It is a major objective of the present invention to provide a portable computer combined with a detachable keyboard module to facilitate the adjustment of a position of a display screen.

To achieve the above-mentioned object, the portable computer of the present invention comprises a base, a keyboard module, a pushing assembly, a display module, at least one supporting element, and a sliding assembly. The base comprises a front end and a rear end, and a front side and a rear side are between the front end and the rear end. A first area is defined at the front side, and a second area is defined at the rear side. The keyboard module is disposed in the first area and comprises two keyboard portions. Each keyboard portion comprises at least one moving structure by which the keyboard portion can movably combine with the base. The pushing assembly comprises two pushing elements that can be movably combined with the first area of the base. Each pushing element comprises an interference portion and at least one first operating portion corresponding to at least one moving structure. Each first operating portion can drive the moving structure to move towards a second predetermined direction when the pushing element is moved towards a first predetermined direction.

The display module comprises a connecting end and a display surface. Each supporting element comprises a first fixed end and a second fixed end. The first fixed end is pivotally connected to a portion of the display module other than the display surface, such that the display module can rotate relative to the supporting element; the second fixed end is pivotally connected to the rear end or close to the rear end of the base, such that the supporting element can rotate relative to the base. The sliding assembly comprises a slide corresponding element disposed in the base and a sliding element combined with the connecting end while being able to slide along the slide corresponding element. The sliding element comprises a driving structure corresponding to the interference portion.

Accordingly, when the connecting end of the display module moves relative to the base from the second area to the first area, with the driving structure of the sliding element pushing the interference portion to move the pushing element towards the first predetermined direction, the first operating portion of the pushing element drives the moving structure to move towards the second predetermined direction, such that the two keyboard portions are separated from each other with a predetermined gap, which allows the driving structure of the sliding element to be able to continuously sliding forward along the slide corresponding element once it is departed from the interference structure.

In an embodiment of the present invention, the portable computer further comprises a plurality of elastic elements. One end of each elastic element is connected to the base, and the opposite end thereof is connected to the moving structure; when the first operating portion is no longer acting on the moving structure, each elastic element can drive the two keyboard portions to be combined with each other.

In an embodiment of the present invention, each pushing element further comprises at least one second operating portion. Each second operating portion is disposed corresponding to each moving structure. When the pushing assembly moves towards the opposite of the first predetermined direction, each second operating portion pushes each moving structure to drive the two keyboard portions to combine with each other.

Through the design of the present invention, users only need to flip the display module relative to the base to make the connecting end of the display module slide along with the sliding element towards the front end or rear end of the base. Through the operation of the sliding element in coordination with the pushing assembly, the two keyboard portions can be separated from or combined with each other, such that the display module can be flipped relative to the base about 180 degrees and superimposed on the base, and allow the display surface or support surface to face towards the base in accordance with the display module to provide different states of use for the portable computer.

DETAILED DESCRIPTION OF THE PREFERRED EMBODIMENT

The technical content of the invention will become more apparent from the following detailed description of several preferred embodiments.

Figure 1:
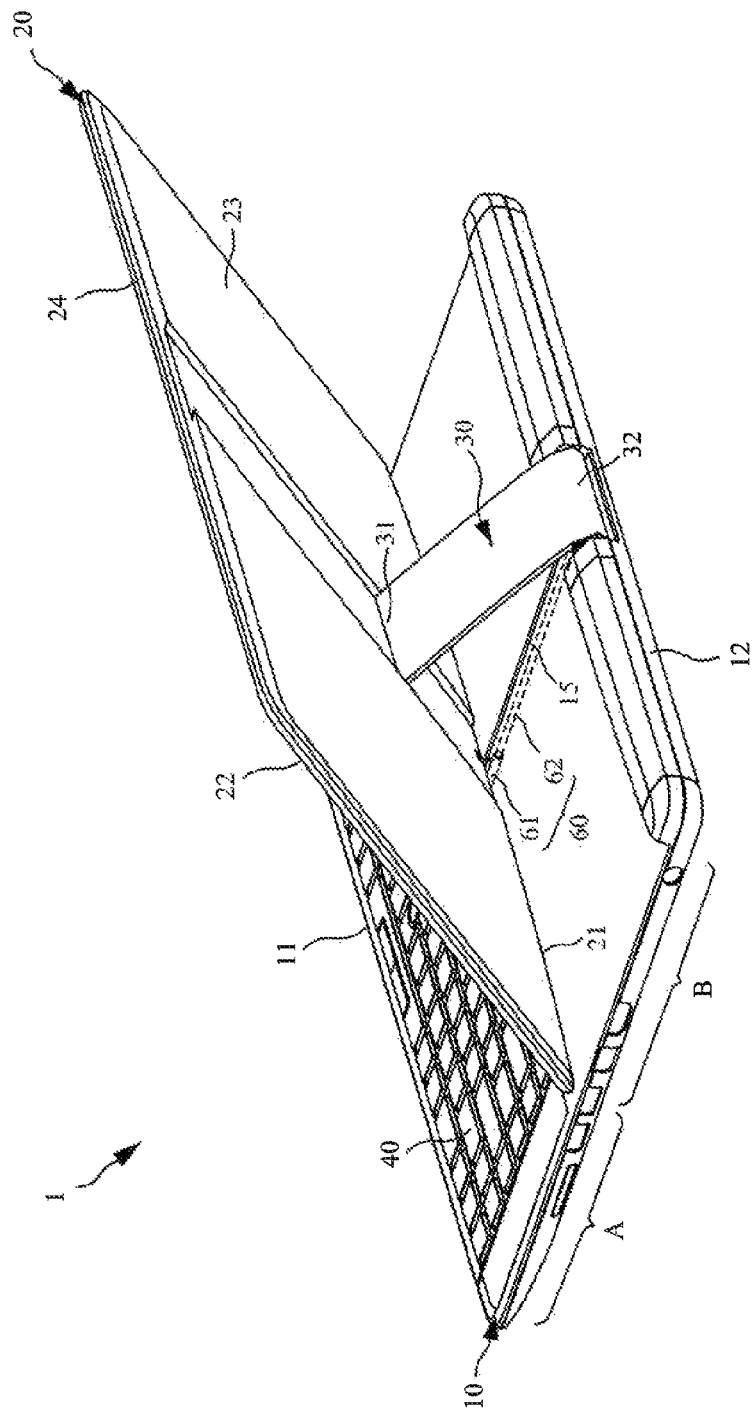
FIG. 1 is a view showing a portable computer of the present invention in a first embodiment.
Figure 2:
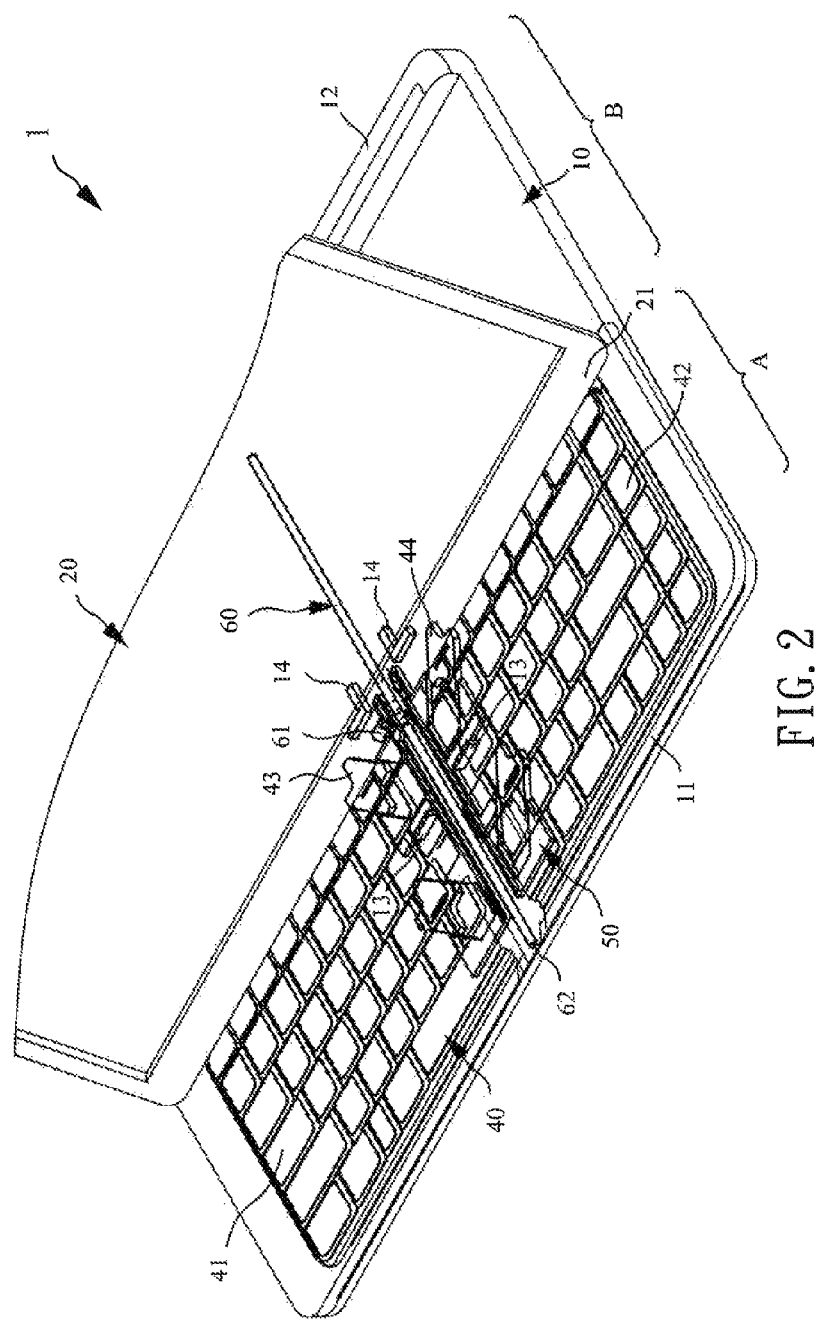
FIG. 2 is a view showing the portable computer of the present invention from another viewing angle in the first embodiment.

Please refer to both FIG. 1 and FIG. 2. FIG. 1 is a view showing a portable computer 1 in a first embodiment of the present invention; FIG. 2 is a view showing the portable computer 1 in the first embodiment of the present invention from another viewing angle. In an embodiment of the present invention, the portable computer 1 is a notebook computer. However, depending on the type of the application, the portable computer 1 can also be a tablet PC, netbook, or other electronic device with a flip display module, and it is thus not limited to the present embodiment.

As shown in FIGS. 1 and 2, the portable computer of the present invention 1 comprises a base 10, a display module 20, at least one supporting element 30, a keyboard module 40, a pushing assembly 50, and a sliding assembly 60. The interior of the base 10 has a computer central processing unit and related electronic parts. In this embodiment, the base 10 comprises a front end 11, a rear end 12, a first blocking portion 13, and a second blocking portion 14, wherein the first blocking portion 13 and the second blocking portion 14 are used to limit the distance that the pushing assembly 50 can move towards the front end 11 and rear end 12 of the base 10. A front side and a rear side are between the front end 11 and the rear end 12 of the base 10. A first area A is approximately defined on the front side, and a second area B is approximately defined on the rear side between the front end 11 and rear end 12 of the base 10.

The display module 20 comprises a connecting end 21, a display surface 22, a support surface 23, and a free end 24. The display surface 22 and the support surface 23 are opposite each other, and the connecting end 21 and the free end 24 are opposite each other. Also, a rotatable pivot joint in the central part of the connecting end 21 is formed by enabling a hinge or shaft component to be combined with the sliding element 61 of the sliding assembly 60, such that the display module 20 can rotate relative to the sliding element 61. The display surface 22 of the display module 20 can be provided with a display screen that supports touch control for receiving the user's touch operation.

The supporting element 30 comprises a first fixed end 31 and a second fixed end 32. The first fixed end 31 can be pivotally connected to a portion of the display module 20 other than the display surface 22. In this embodiment, the first fixed end 31 is pivotally connected to the support surface 23 of the display module 20 by means of, for example, a hinge element, to form a rotatable pivot joint for the display module 20 to rotate relative to the supporting element 30. The second fixed end 32 can also be pivotally connected to the rear end 12 of the base 10 by means of, for example, a hinge element, to form another rotatable pivot joint for the supporting element 30 to rotate relative to the base 10. In this embodiment, the design of a single supporting element 30 is adopted, but the number and positions of the supporting elements 30 are not limited to this.

Figure 3:
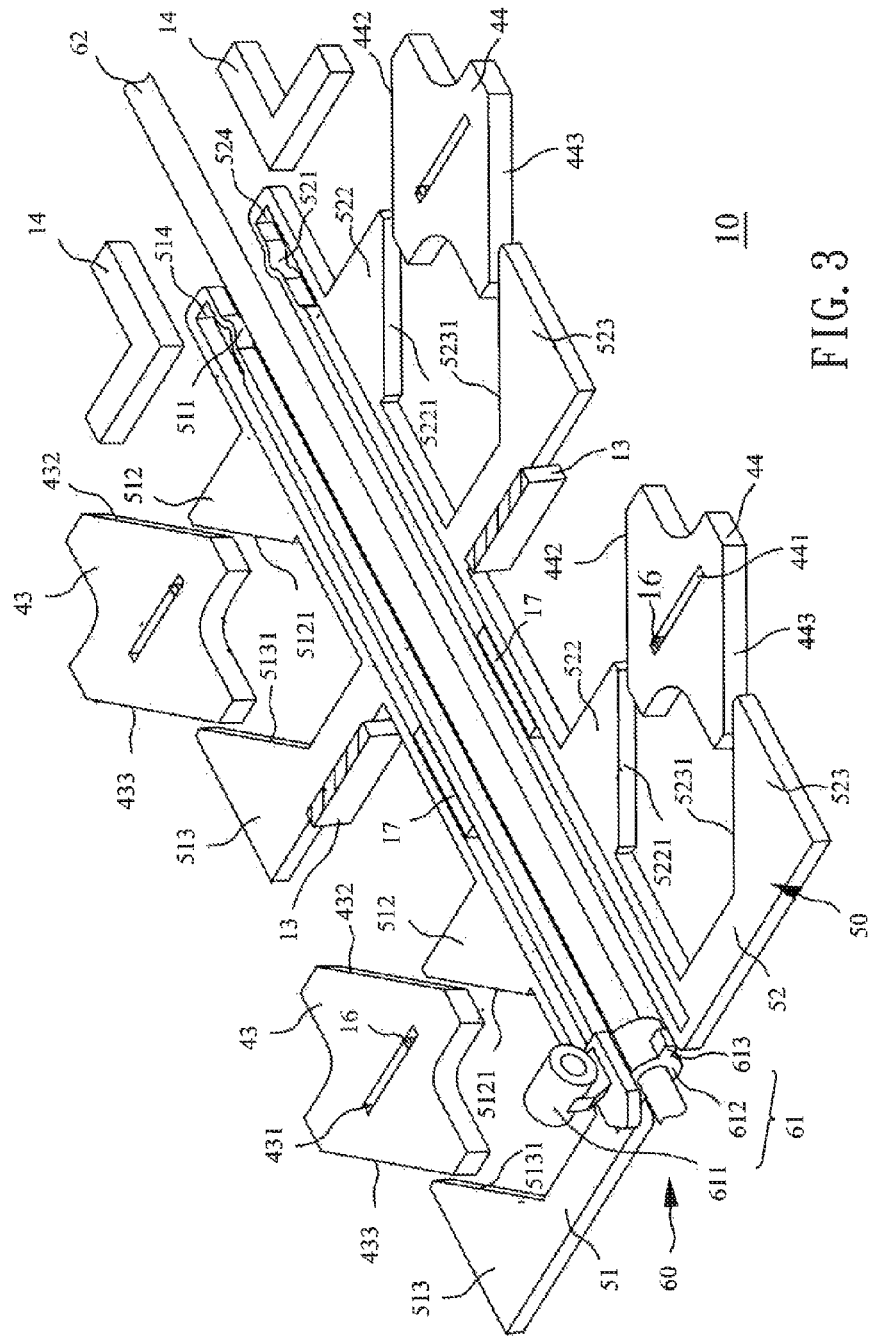
FIG. 3 is a view showing the moving structure, pushing assembly, and sliding assembly of the portable computer combined with the base in the first embodiment of the present invention.

Please refer to both FIGS. 2 and 3 thereinafter. FIG. 3 is a view showing the pushing assembly 50 and sliding assembly 60 of the portable computer 1 combined with the base 10 in the first embodiment of the present invention. It is noted that in order to clearly present the structure of the pushing assembly 50 and sliding assembly 60, only the moving structure 43 or 44 of each keyboard portion in the keyboard module is illustrated in FIG. 3, and two keyboard portions of the keyboard module are omitted.

As shown in FIGS. 2 and 3, the keyboard module 40 of the portable computer 1 of the present invention is disposed in the aforementioned first area A of the base 10. The keyboard module 40 comprises two separable keyboard portions 41 and 42, each of which comprises at least one moving structure. (In this embodiment, each keyboard portion 41 and 42 comprises two moving structures 43 or 44, but the number of the moving structures 43 or 44 is not limited to the present embodiment), such that the keyboard portion 41 can be movably combined with the surface of the base 10 through the moving structure 43, and the keyboard portion 42 can be movably combined with the surface of the base 10 through the moving structure 44.

The moving structures 43 and 44, which are correspondingly disposed at the bottom of the two keyboard portions 41 and 42, are components with the symmetrical structure and placement position. In this embodiment, each of the moving structures 43 and 44 comprises a moving groove 431 or 441, a first corresponding inclined structure 432 or 442, and a second corresponding inclined structure 433 or 443. A protruding pillar 16 is provided corresponding to each of the moving grooves 431 or 441 on the base 10 to be plugged into the moving grooves 431 or 441, such that the protruding pillar 16 can slide within the moving grooves 431 or 441; preferably, the moving groove 431 or 441 is located in the same linear position, such that each of the moving structures 43 or 44 can move away from or close to the base 10, but the present invention is not limited to this.

The pushing assembly 50 can be movably combined with the central part or close to the central part of a first area A of the base 10 and is disposed corresponding to the sliding assembly 60. The pushing assembly 50 comprises two pushing elements 51 and 52 with homogeneous symmetric structure and setting position. In this embodiment, each of the pushing elements 51, 52 comprises an interference portion 511 or 521, at least one first operating portion, and at least one second operating portion. (In this embodiment, each of the pushing elements 51 and 52 comprises two first operating portions 512 or 522 and two second operating portions 513 or 523. The first operating portions 512 or 522 and the second operating portion 513 or 523 are disposed corresponding to the aforementioned moving structure 43 or 44, and their number is not limited to that in the present embodiment).

In this embodiment, the interference portion 511 or 521 is a bump structure with elasticity. The first operating portion 512 or 522 comprises a first inclined structure 5121 or 5221, which is disposed corresponding to the first corresponding inclined structure 432 or 442 of the moving structure 43 or 44; the second operating portion 513 or 523 comprises a second inclined structure 5131 or 523.1, which is disposed corresponding to the second corresponding inclined structure 433 or 443 of the moving structure 43 or 44.

In addition, the pushing element 51 or 52 further comprises a stop groove 514 or 524, and the base 10 further comprises a plurality of stop structures 17 that can be correspondingly accommodated within each of the stop grooves 514 or 524. Through the design of a plurality of stop structures 17 in coordination with each of the stop grooves 514 or 524, the pushing elements 51 and 52 can only move along a straight line, which is used to limit the direction of movement for the pushing assembly 50.

As shown in FIGS. 1 to 3, the sliding assembly 60 comprises a sliding element 61 and a slide corresponding element 62. The slide corresponding element 62 is steadily disposed at the base 10 and extends through the first area A and the second area B. The sliding element 61 is connected to the connecting end 21 of the display module 20 to provide the sliding and pivoting function for the display module 20, and can slide relative to the base 10 along the slide corresponding element 62 between the rear end 12 and the front end 11 of the base 10. A slit 15, which is disposed in the center of the top surface between the rear end 12 and the front end 11 of the base 10, also extends through the first area A and the second area B. The sliding assembly 60 is disposed within the base 10 in the position corresponding to the slit 15 for the sliding element 61 to pass through the slit 15 and slide between the rear end 12 and the front end 11 of the base 10.

Meanwhile, the sliding element 61 comprises a pivoting portion 611, a sliding portion 612, and a driving structure 613. The connecting end 21 of the display module 20 is pivotally connected to the sliding element 61 is through the pivoting portion 611. The sliding portion 612 is connected to the pivoting portion 611, and the sliding portion 612 can be movably combined to the slide corresponding element 62, such that the sliding element 61 can slide along the slide corresponding element 62. The driving structure 613 is disposed corresponding to the interference portion 511 or 521 of each pushing element 51 or 52 to push against the interference portions 511 and 521 through the driving structure 613 to drive each of the pushing elements 51 or 52 to move. In this embodiment, the slide corresponding element 62 is a rod piece, and the sliding element 61 is a sleeve member, which is combined with the rod piece by means of the bored or sleeved approach to slip along the rod piece, but the present invention is not limited to this. For example, the sliding element 61 and the slide corresponding element 62 can be replaced by the combination of a slider and a slide rail where the slider is disposed within the slide rail and slides along the slide rail. In addition, the driving structure 613 is a set of protruding structure disposed on the outer surface of the sliding portion 612 of the sliding element 61, but its structure and setting position are not limited to the present embodiment.

Figure 4A:
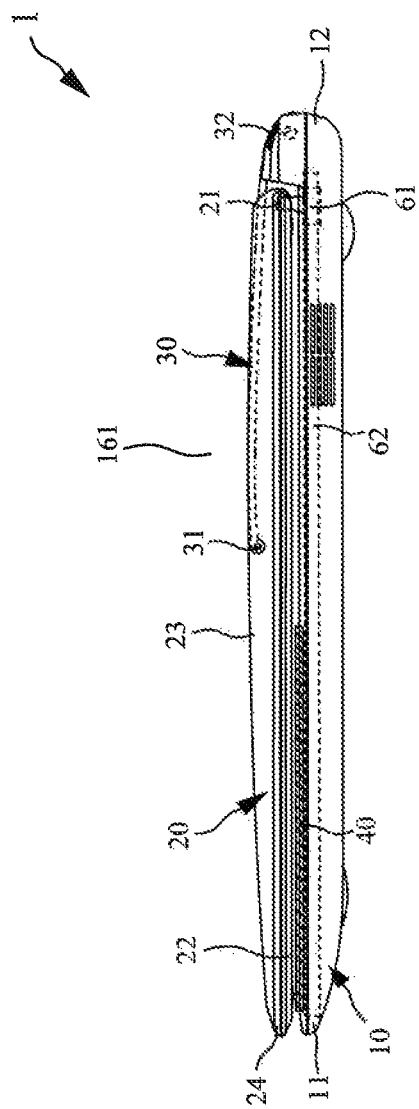
FIG. 4(a) is a view showing the portable computer of the present invention in a closed state.
Figure 4B:
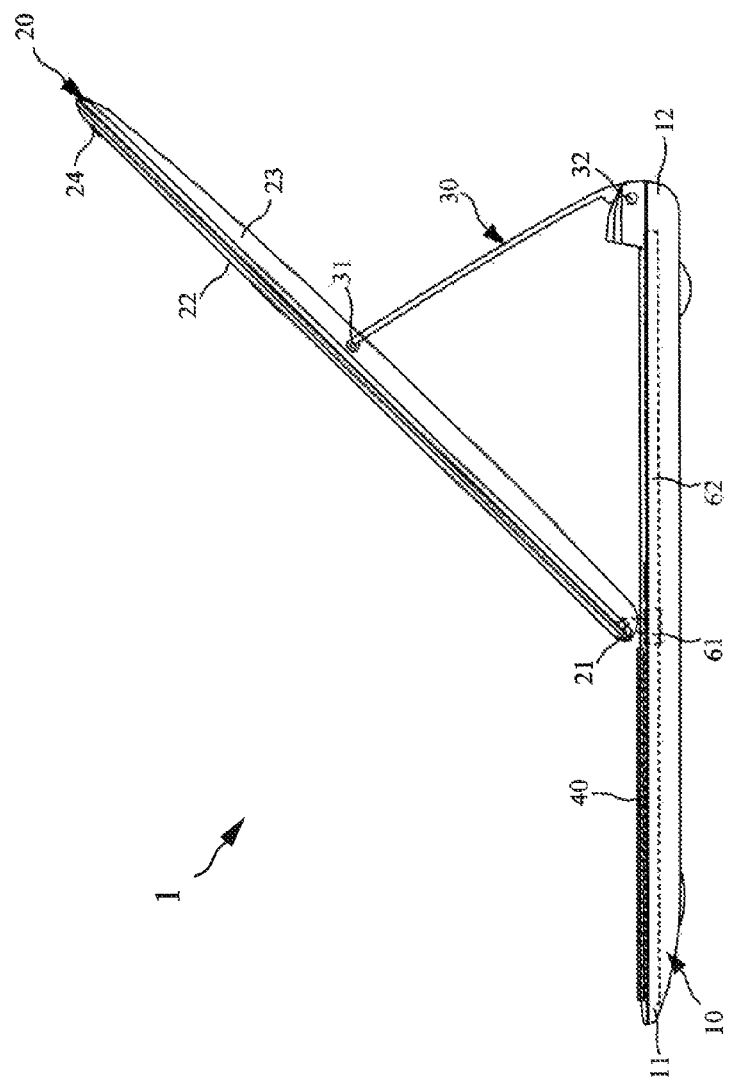
FIG. 4(b) is a view showing the portable computer of the present invention in a general use state.
Figure 4C:
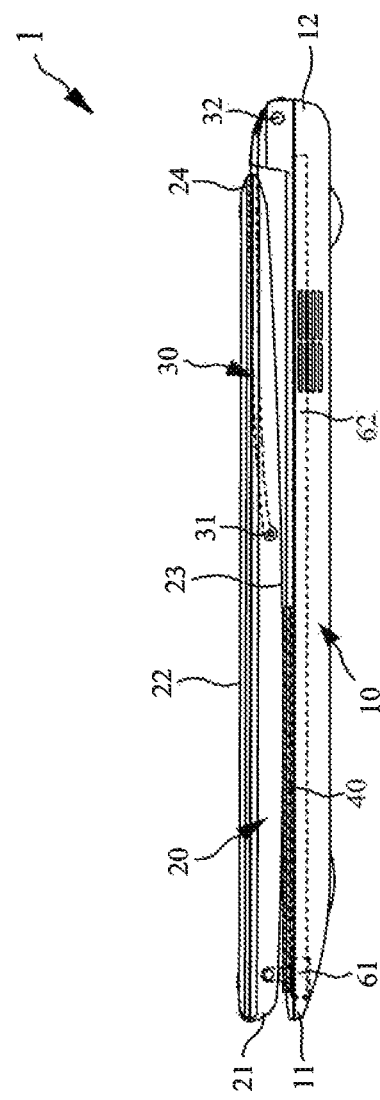
FIG. 4(c) is a view showing the portable computer of the present invention in a tablet state.
Figure 5A:
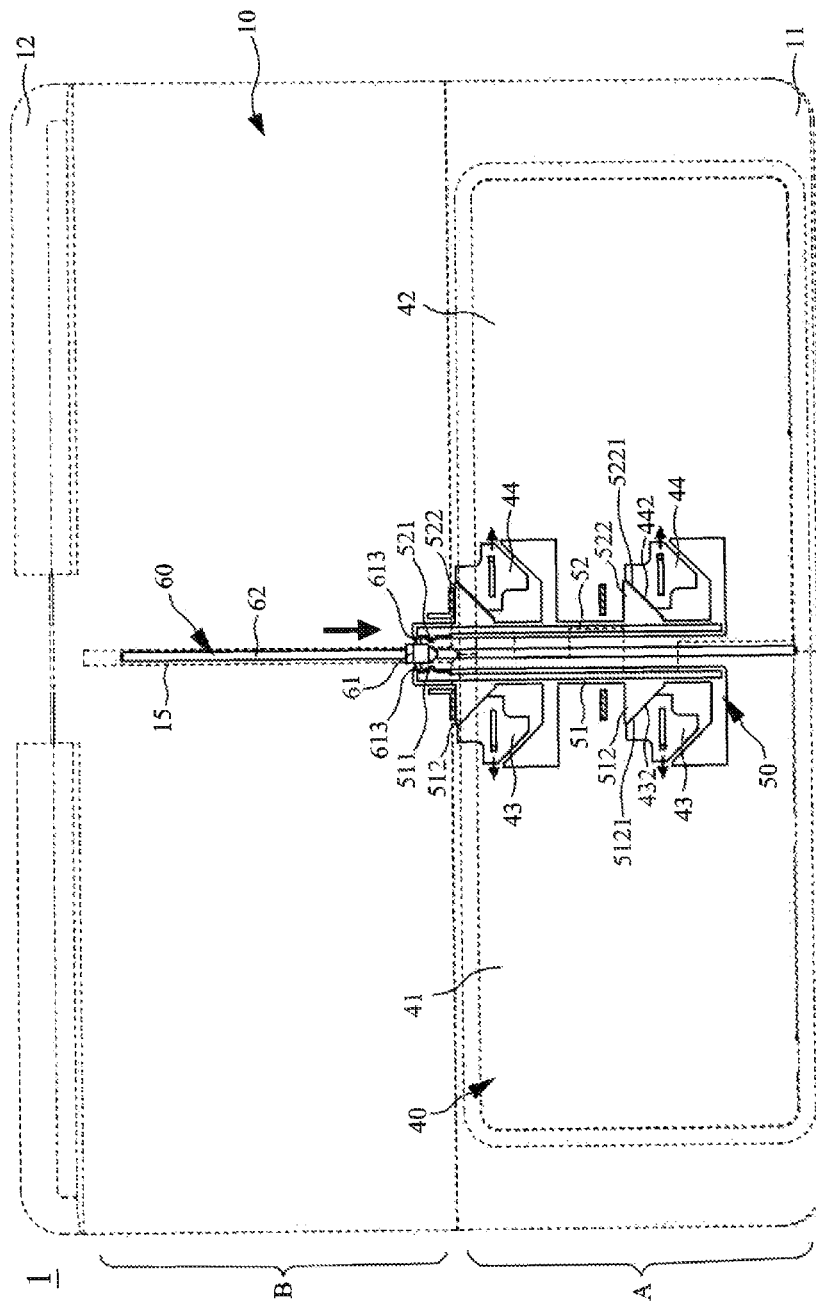
FIG. 5(a) is a view showing the sliding element of the portable computer of the present invention being close to the keyboard module in the first embodiment.
Figure 5B:
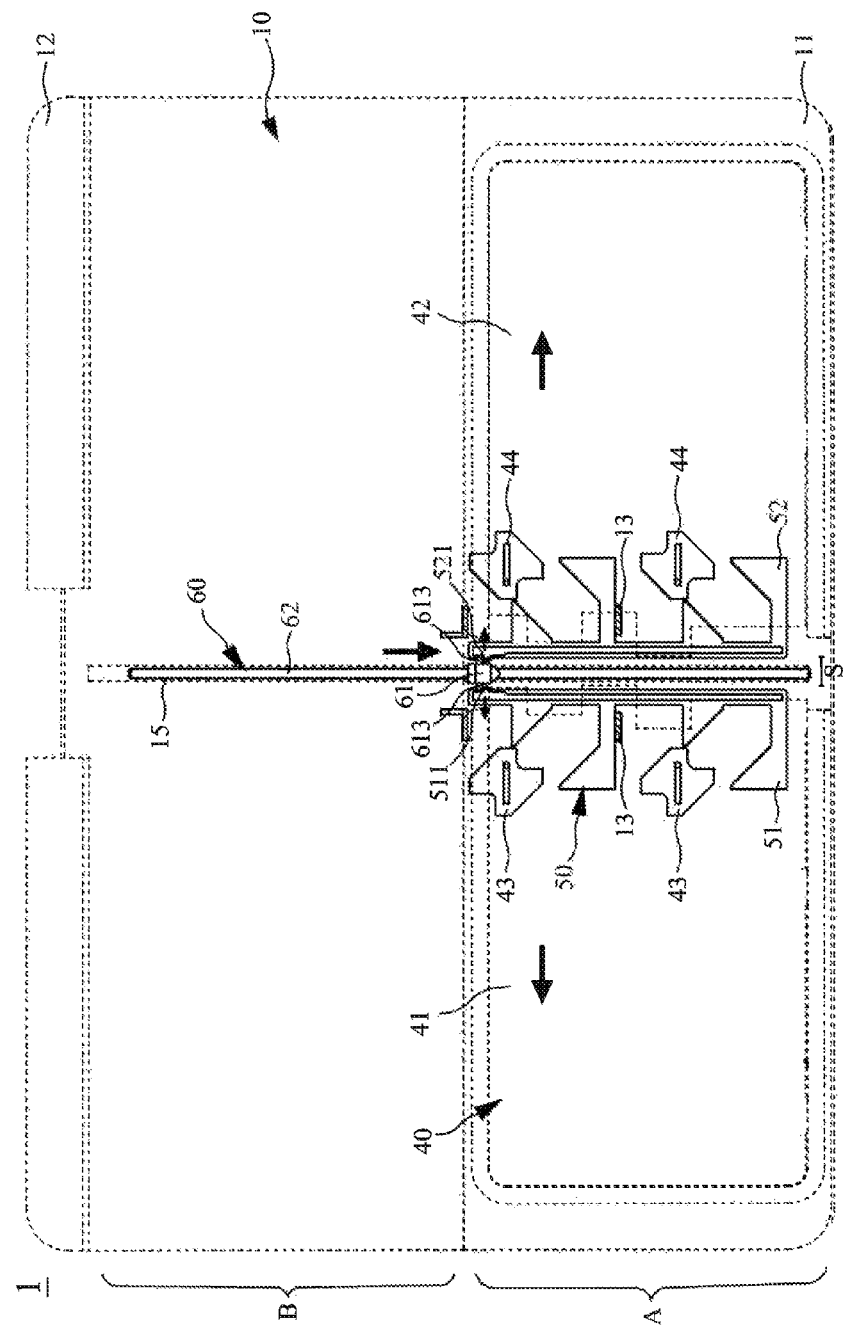
FIG. 5(b) is a view showing the sliding element of the portable, computer of the present invention pushing the pushing assembly to move towards a front end in the first embodiment.
Figure 5C:
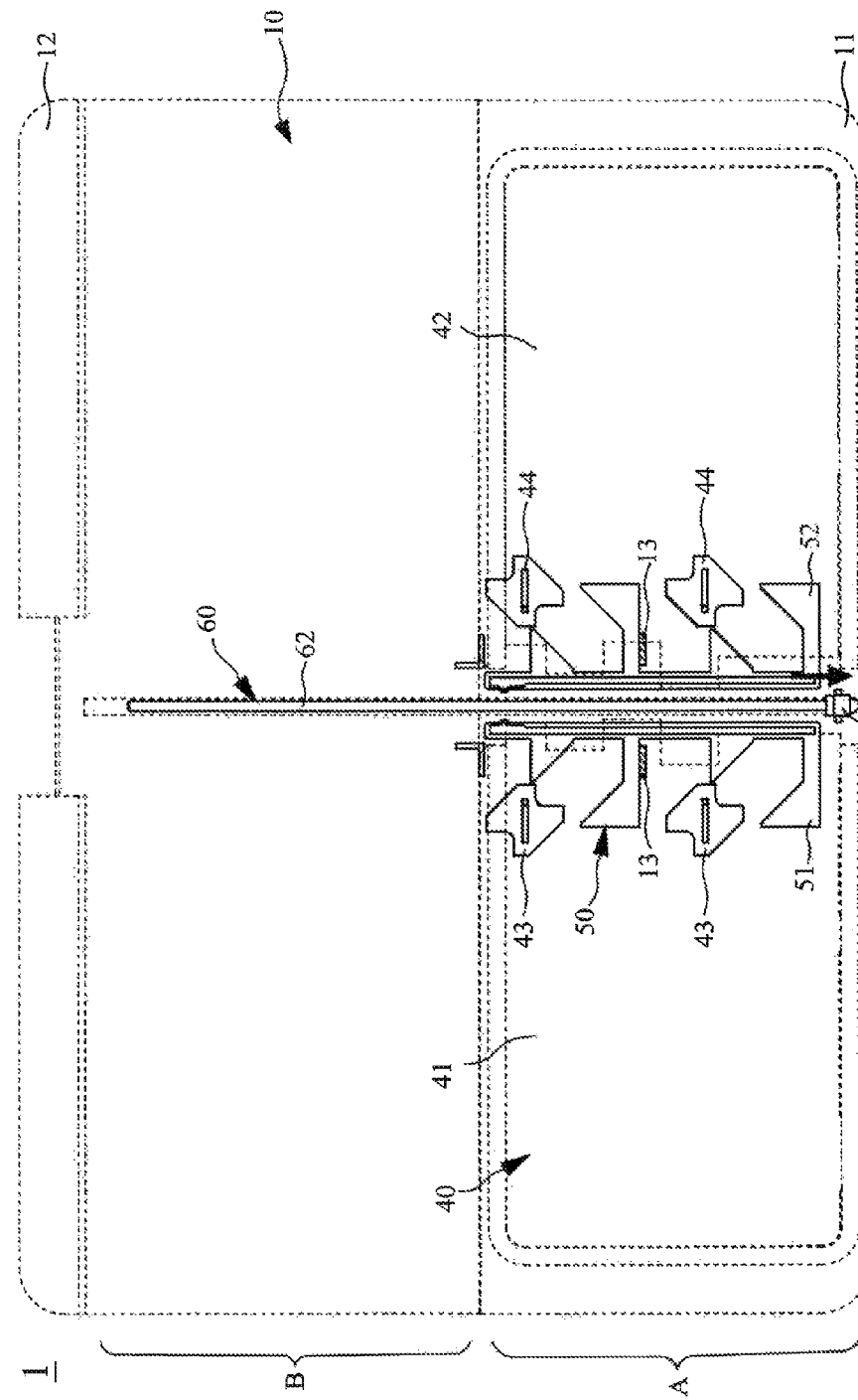
FIG. 5(c) is a view showing the sliding element of the portable computer of the present invention passing through the keyboard module in the first embodiment.
Figure 5D:
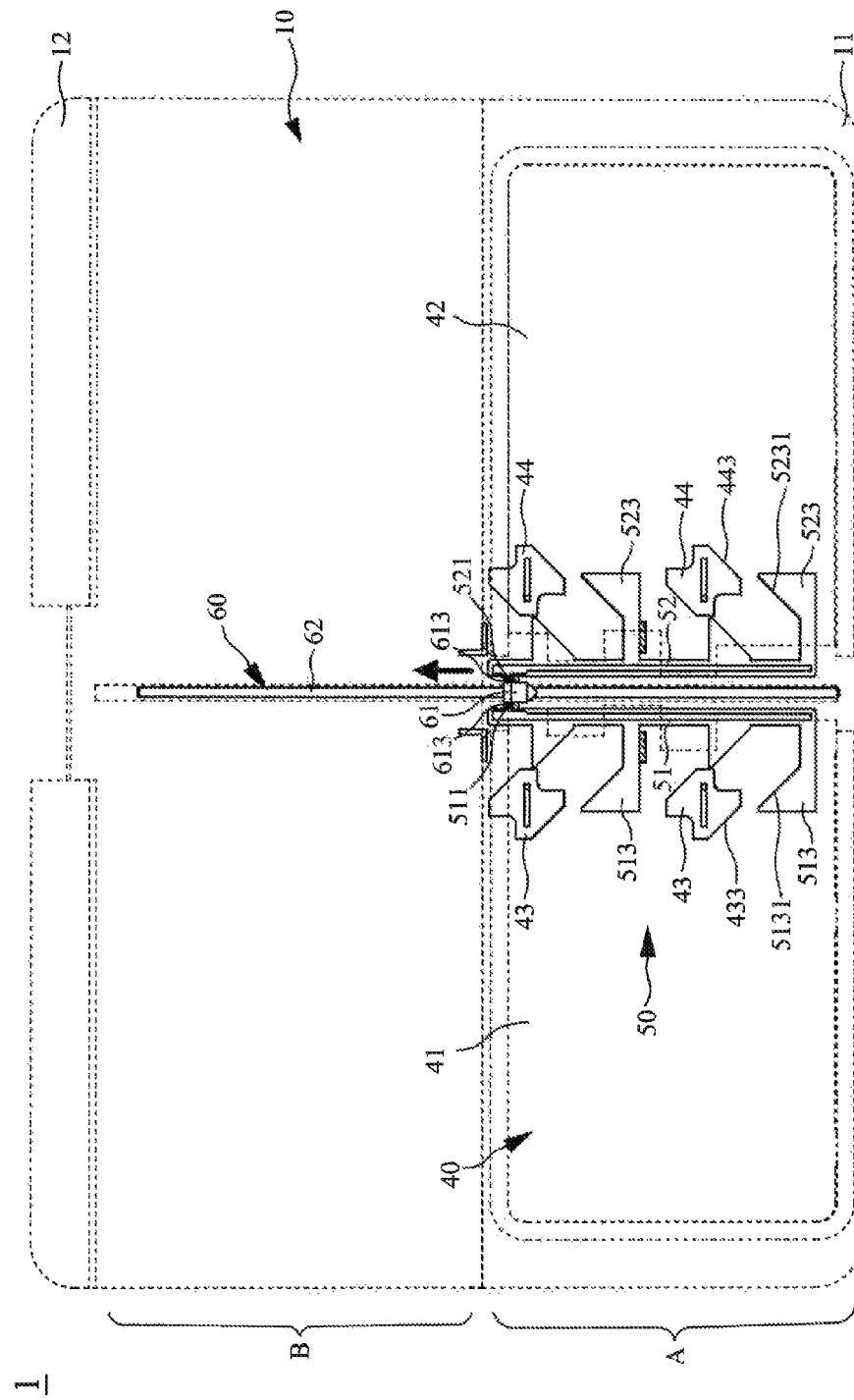
FIG. 5(d) is a view showing the sliding element of the portable computer of the present invention pushing the pushing assembly to move towards a rear end in the first embodiment.
Figure 5E:
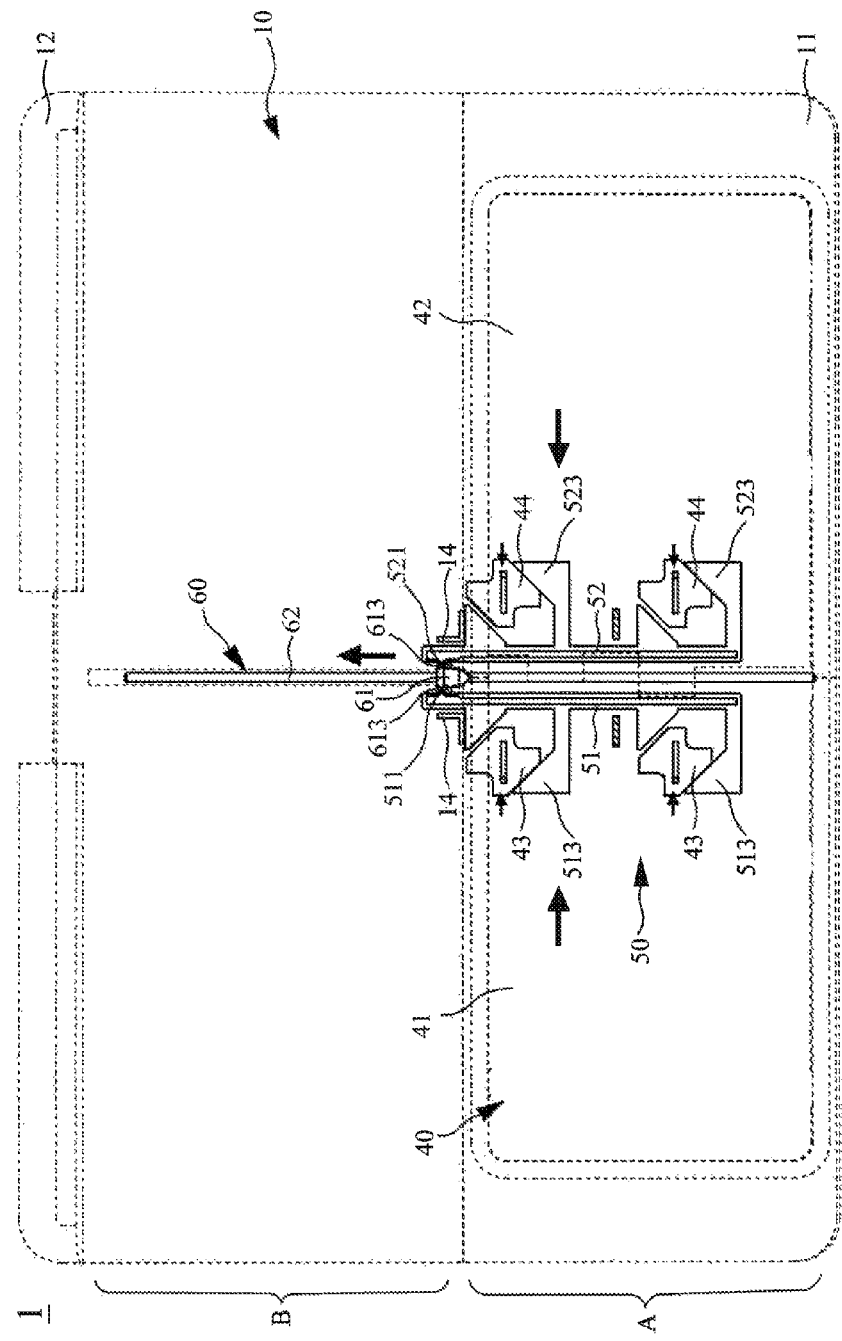
FIG. 5(e) is a view showing the sliding element of the portable computer of the present invention being away from the keyboard module in the first embodiment.

Please refer to all of FIGS. 4(a), (b), and (c). FIG. 4(a) is a view showing the portable computer 1 of the present invention in a closed state; FIG. 4(b) is a view showing the portable computer 1 of the present invention in a general use state; FIG. 4(c) is a view showing the portable computer 1 of the present invention used as a tablet computer.

As shown in FIG. 4(a), when the portable computer 1 of the present is invention is in a closed state, the display module 20 is superimposed on the base 10 and pivotally connected to the sliding element 61 by means of the connecting end 21. At this time, the display surface 22 of the display module 20 faces the base 10; the supporting element 30 is also superimposed on the display module 20 and pivotally connected to the rear end 12 of the base 10 and the display module 20 respectively by means of the first fixed end 31 and the second fixed end 32.

As shown in FIG. 4(b), when a user forces the free end 24 on the opposite side relative to the connecting end 21 of the display module 20 to flip the display module 20, in the process of exiting the closed state, first, the display module 20 will rotate relative to the base 10 with the supporting element 30 using the second fixed end 32 as a pivot; after it is rotated and lifted over a certain angle, through the aforementioned design of the supporting element 30, the display module 20 starts to rotate relative to the supporting element 30 using the first fixed end 31 of the supporting element 30 as a pivot. Meanwhile, the display module 20 rotates relative to the sliding element 61 using the connecting end 21 as a pivot and pushes the sliding element 61 forward, and drives the connecting end 21 of the display module 20 to slide forward towards the front end 11 of the base 10 through the sliding element 61 until the connecting end 21 gets close to the keyboard module 40. At this time, the portable computer 1 of the present invention is presented in a state of general notebook use.

When the user continues to force the free end 24 of the display module 20 to make the sliding element 61 continue to drive the connecting end 21 of the display module 20 to move forward towards the front end 11 of the base 10, the pushing assembly (not shown) in the present invention will be driven such that the two keyboard portions of the keyboard module 40 will be separated from each other and a channel will be formed for the sliding element 61 to pass through the keyboard module 40. Eventually, the sliding element 61 will drive the connecting end 21 of the display module 20 to move close to the front end 11 of the base 10. At this time, the display module 20 is superimposed on the base 10, and the support surface 23 of the display module 20 faces towards the base 10, such that the portable computer 1 of the present invention is presented in a state of tablet use, as shown in FIG. 4(*c*).

Please refer to all of FIGS. 5(*a*), (*b*), (*c*), (*d*), and (*e*). FIG. 5(*a*) is a view showing the sliding element 61 of the portable computer 1 being close to the keyboard module 40 in the first embodiment of the present invention; FIG. 5(*b*) is a view showing the sliding element 61 of the portable computer 1 pushing the pushing assembly 50 to move towards the front end 11 in the first embodiment of the present invention; FIG. 5(*c*) is a view showing the sliding element 61 of the portable computer 1 passing through the keyboard module 40 to the front end 11 in the first embodiment of the present invention; FIG. 5(*d*) is a view showing the sliding element 61 of the portable computer 1 pushing the pushing assembly 50 to move towards the rear end 12 in the first embodiment of the present invention; FIG. 5(*e*) is a view showing the sliding element 61 of the portable computer 1 being away from the keyboard module 40 towards the rear end 12 in the first embodiment of the present invention. It is noted that in order to clearly present the relationship among the keyboard module 40, pushing assembly 50, and sliding assembly 60, components such as the display module and the supporting element are omitted in the figures.

As shown in FIG. 5(*a*), when the portable computer 1 of the present invention is kept in the position and state as shown in FIG. 4(*b*), the sliding element 61 of the sliding assembly 60 slides along the slide corresponding element 62 within the slit 15 towards the front end 11 of the base 10, from the second area B to close to the first area A of the keyboard module 40, then the driving structure 613 of the sliding element 61 will gradually come into contact with the interference portions 511 and 521 of two pushing elements 51 and 52 of the pushing assembly 50. Through the mutual interference of the driving structure 613 and the interference portions 511 and 521, the two pushing elements 51 and 52 will be pushed by the sliding element 61 to move towards the direction of the arrow (defined as the first predetermined direction) in FIG. 5(*a*).

While the two pushing elements 51 and 52 are continuously being pushed by the sliding element 61, the first operating portions 512 and 522 of the two pushing elements 51 and 52 will push against the corresponding first corresponding inclined structures 432 and 442 of the moving structures 43 and 44 through its first inclined structures 5121 and 5221; through the dynamic interaction of the inclined structures, the moving structures 43 and 44 will move horizontally relative to the base 10 towards the lateral side away from each other, as shown in FIG. 5(*b*), in the direction opposite to the direction substantially perpendicular to the movement of the two pushing elements 51 and 52 (defined as a second predetermined direction). The movement of the moving structures 43 and 44 will drive respectively the corresponding keyboard portions 41 and 42 to move and separate from each other such that a gap S that can allow the sliding element 61 to pass through is formed between the two keyboard portions 41 and 42.

Also, as shown in FIG. 5(*b*), the sliding element 61 continues pushing against the interference portions 511 and 521 of the two pushing elements 51 and 52 through the driving structure 613, such that the two pushing elements 51 and 52 are blocked by the first blocking portion 13 of the base 10 and stop moving toward the front end 11. Later, since the interference portions 511 and 521 are bump structures with elasticity, when the sliding element 61 is forced continuously, the interference portions 511 and 521 will move toward the direction of the arrow such that the driving structure 613 passes through the interference portions 511 and 521 and the sliding element 61 continues moving along the gap S towards the front end 11 and finally reaches the position shown in FIG. 5(*c*). Consequently, the portable computer 1 of the present invention will be presented in a state of tablet use shown in FIG. 4(*c*) described above.

Conversely, when the user wants to change the portable computer 1 of is the present invention from the tablet state in FIG. 4(*c*) back to the general use state in FIG. 4(*b*), through applying the inverse force to the free end of the display module, the sliding element 61 of the sliding assembly 60 slides along the slide corresponding element 62 from the front end 11 of the base 10 towards the rear end 12. Then the sliding element 61 is away from the keyboard module 40, as shown in FIG. 5(*d*); the driving structure 613 of the sliding element 61 will contact the interference portions 511 and 521 of the two pushing elements 51 and 52 again. Furthermore, through interference between the driving structure 613 and the interference portions 511 and 521, the two pushing elements 51 and 52 will be pushed by the sliding element 61 and then move towards the rear end 12 of the base 10 in the direction opposite to the first predetermined direction.

While the two pushing elements 51 and 52 are continuously being pushed by the sliding element 61 towards the rear end 12 of the base 10, the second operating portions 513 and 523 of the two pushing elements 51 and 52 will push against the second corresponding inclined structures 433 and 443 of the corresponding moving structures 43 and 44 through the second inclined structures 5131 and 5231. Employing the dynamic interaction characteristic of the inclined structure, the moving structures 43 and 44 will horizontally move in the direction close to each other, as shown in FIG. 5(*e*), in the direction substantially perpendicular to movement of the two pushing elements 51 and 52 (i.e., the direction opposite to the second predetermined direction). The movement of the moving structures 43 and 44 will respectively drive the corresponding keyboard portions 41 and 42 to move and gradually combine with each other; the gap between the two keyboard portions 41 and 42 will consequently disappear.

Also, as shown in FIG. 5(*e*), the sliding element 61 continues pushing backward against the two pushing elements 51 and 52, such that the two pushing elements 51 and 52 are blocked by the second blocking portion 14 of the base 10 and stop moving towards the rear end 11, as mentioned above; when the sliding element 61 is continuously forced, the driving structure 613 will pass through the interference portions 511 and 521 such that the sliding element 61 can move along the slide corresponding element 62 towards the rear end 11 to be gradually away from the keyboard module 40 from the first area A back to the second area B. At this point, the portable computer 1 of the present invention is back to the general use state shown in FIG. 4(*b*).

Figure 6:
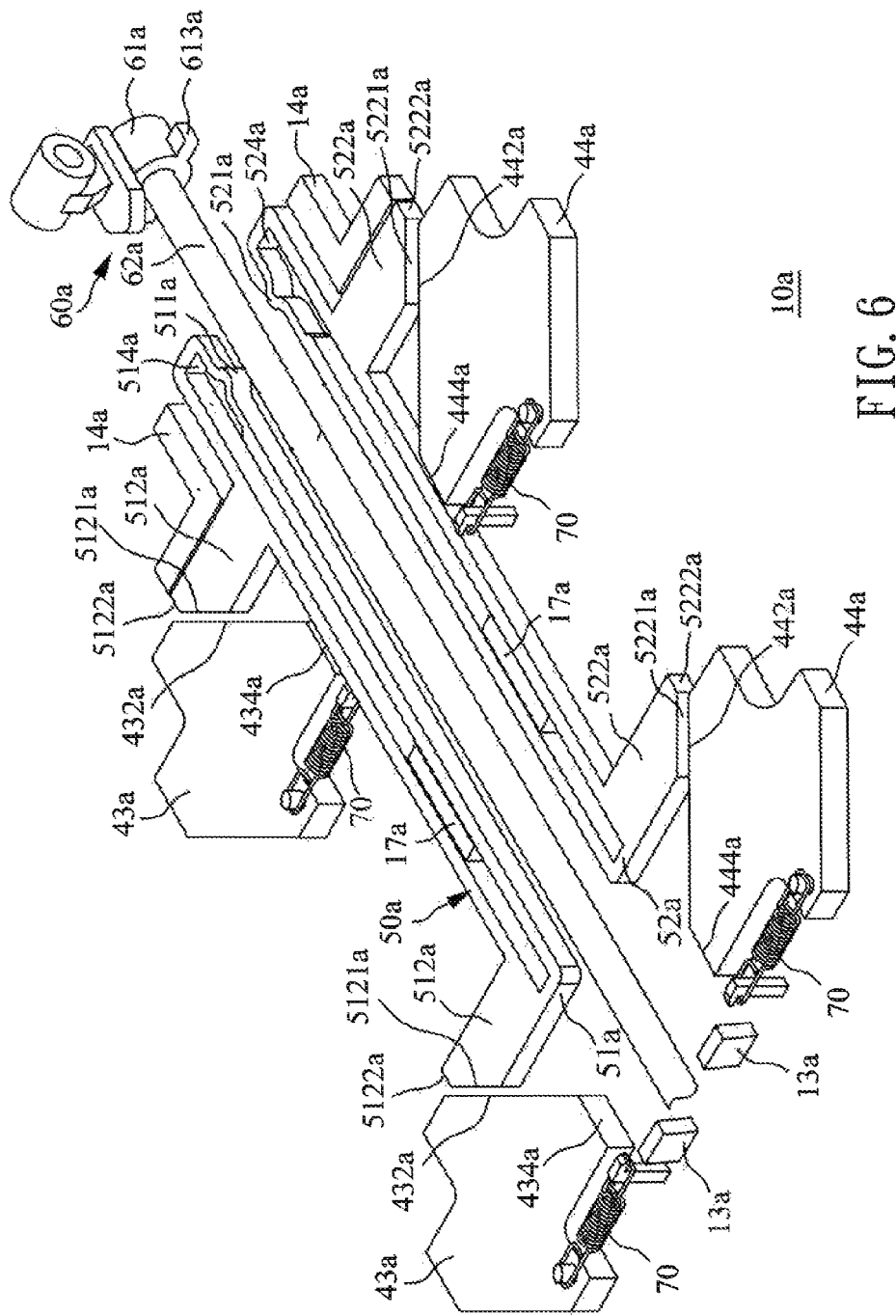
FIG. 6 is a view showing the moving structure, pushing assembly, and sliding assembly combined with the base in a second embodiment of the present invention.

Please refer to FIG. 6, which is a view showing the pushing assembly 50*a* and sliding assembly 60*a* of the portable computer combined with the base 10*a* in the second embodiment of the present invention. It is noted that in order to clearly present the structure of the pushing assembly 50*a* and the sliding assembly 60*a*, only the moving structures 43*a* and 44*a* of each keyboard portion in the keyboard module are illustrated in FIG. 6, and the two keyboard portions of the keyboard module are omitted.

As shown in FIG. 6, the second embodiment is a variation of the aforementioned first embodiment, wherein the design of the portions 513 and 523 in the aforementioned first embodiment are discarded in the pushing elements 51*a* and 52*a*. In this embodiment, each of the two keyboard portions comprises two moving structures 43*a* or 44*a*, by which the two keyboard portions can be movably combined onto the base 10*a*. The moving structures 43*a* and 44*a*, which are correspondingly disposed at the bottom of the two keyboard portions respectively, are components with symmetrical structure and placement position. Each of the moving structures 43*a* and 44*a* comprises a first corresponding inclined structure 432*a* or 442*a*, and the present invention further comprises a plurality of elastic elements 70. One end of each elastic element 70 is connected to the base 10*a*, and the opposite end of each elastic element 70 is connected to the moving structure 43*a* or 44*a* such that the moving structure 43*a* or 44*a* has an automatic recovery effect relative to the base 10*a* after being away and displaced. As a result, the two moving structures 43 and 44 restored to their original position by using and pushing the second operating portions 513 and 523 along the second corresponding inclined structures 433 and 443 in the aforementioned first embodiment is replaced. Each of the moving structures 43*a* and 44*a* further comprises a first corresponding top surface 434*a* or 444*a* disposed in its innermost side close to the slide corresponding element 62*a*.

In this embodiment, the pushing assembly 50*a* comprises two pushing elements 51*a* and 52*a*, and each of the pushing elements 51*a* and 52*a* comprises the interference portion 511*a* or 521*a* and two first operating portions 512*a* or 522*a* disposed corresponding to the aforementioned moving structures 43*a* or 44*a*. Each of the first operating portions 512*a* and 522*a* comprises a first inclined structure 5121*a* or 5221*a* that is disposed corresponding to the first corresponding inclined structure 432*a* or 442*a* of the moving structure 43*a* or 44*a*. Each of the first operating portions 512*a* or 522*a* further comprises a first top surface 5122*a* or 5222*a* that is disposed at the outermost end portion and away from the slide corresponding element 62*a*, which is corresponding to the first corresponding top surface 434*a* or 444*a* of the moving structure 43*a* or 44*a*.

In addition, the pushing element 51*a* or 52*a* further comprises a stop groove 514*a* or 524*a*, and the base 10*a* further comprises a plurality of stop structures 17*a* accommodated correspondingly within the stop groove 514*a* or 524*a* respectively. Through the design of enabling a plurality of stop structures 17*a* to operate in coordination with each stop groove 514*a* or 524*a*, the pushing elements 51*a* and 52*a* can only move along a straight line, which is used to limit the direction of movement for the pushing assembly 50*a*.

Figure 7A:
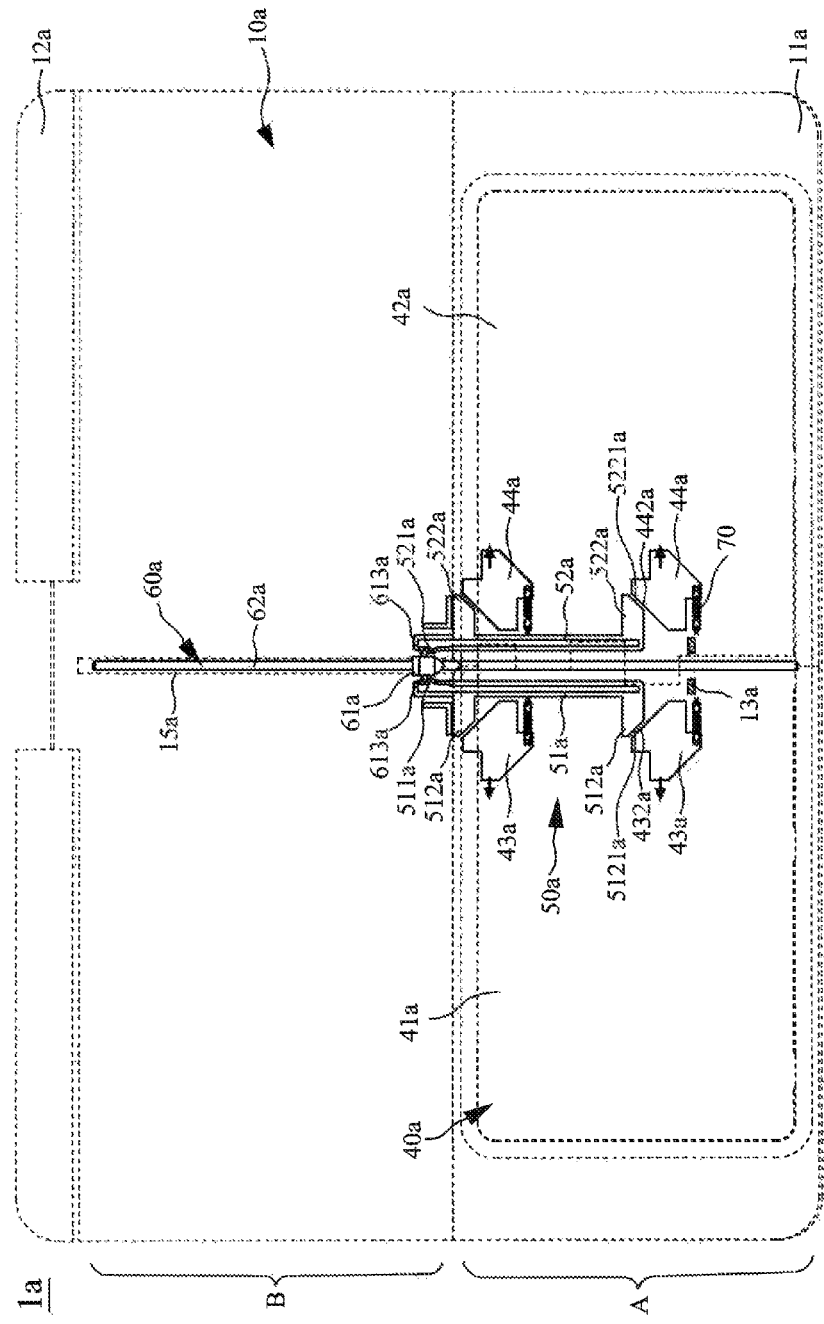
FIG. 7(a) is a view showing the sliding element of the portable computer being close to the keyboard module in the second embodiment of the present invention.
Figure 7B:
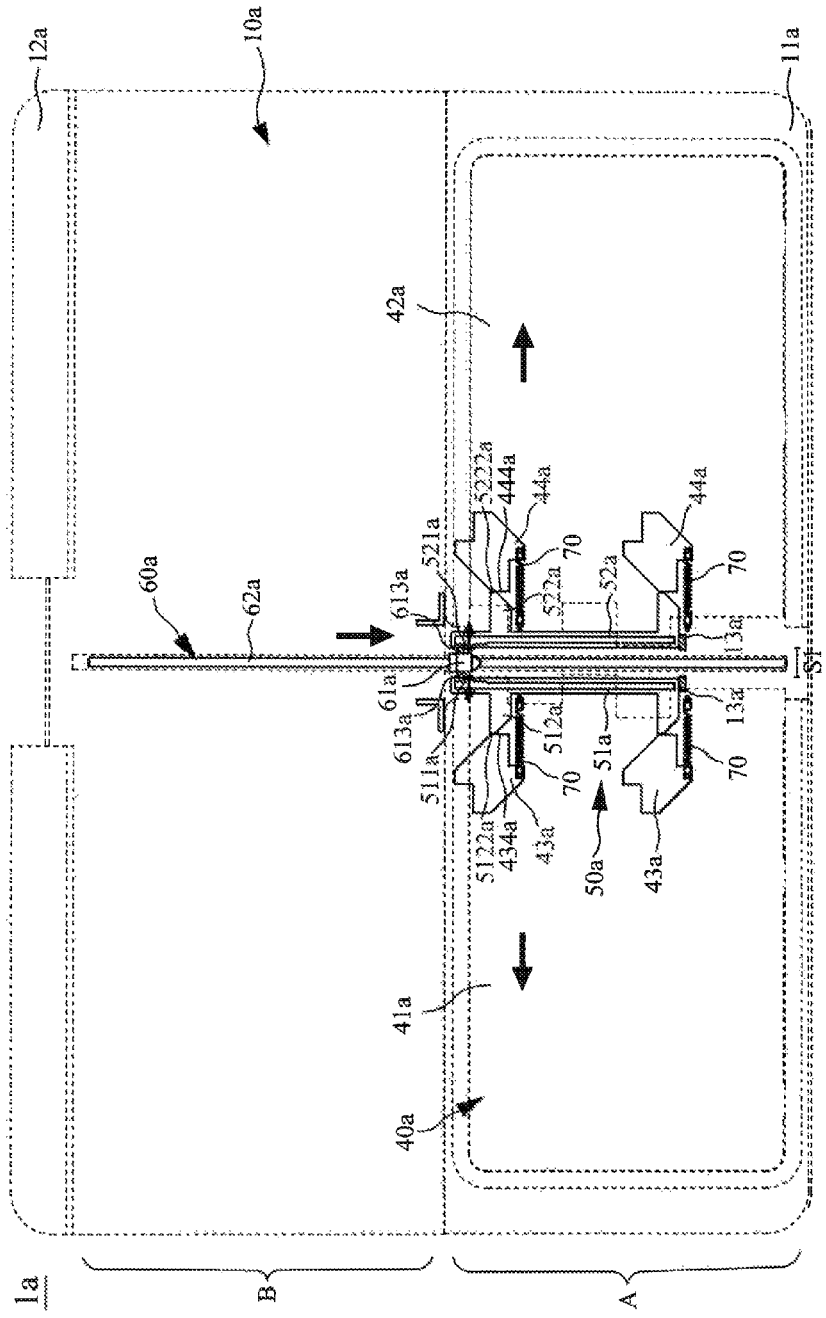
FIG. 7(b) is a view showing the sliding element of the portable computer of the present invention pushing the pushing assembly to move towards a front end in the second embodiment.

Please refer to all of FIGS. 7(*a*), (*b*), (*c*), and (*d*). FIG. 7(*a*) is a view showing the sliding element 61*a* of the portable computer 1*a* being close to the keyboard module 40*a* in the second embodiment of the present invention; FIG. 7(*b*) is a view showing the sliding element 61*a* of the portable computer 1*a* pushing the pushing assembly 50*a* to move toward the front end 11*a* in the second embodiment of the present invention; FIG. 7(*d*) is a view showing the sliding element 61*a* of the portable computer 1*a* being away from the keyboard module 40*a* in the second embodiment of the present invention. It is noted that similar to the aforementioned design, in order to clearly present the relationship among the keyboard module 40*a*, the pushing assembly 50*a*, and the sliding assembly 60*a*, components such as the display module and the supporting element are omitted in each figure.

As shown in FIG. 7(*a*), when the portable computer 1*a* of the present invention is kept in the position/state as shown in FIG. 4(*b*), the sliding element 61*a* of the sliding assembly 60*a* slides along the slide corresponding element within the slit 15*a* from the second area B towards the front end 11*a* of the base 10*a* and gets close to the first area A of the keyboard module 40*a*. Consequently, the driving structure 613*a* of the sliding element 61*a* will gradually contact with the interference portions 511*a* and 521*a* of the two pushing elements 51*a* and 52*a* of the pushing assembly 50*a*; through inference between the driving structure 613*a* and the interference portions 511*a* and 521*a*, the two pushing elements 51*a* and 52*a* will be pushed by the sliding element 61*a* to move towards the direction of the arrow as shown in the figure (defined as the first predetermined direction).

While the two pushing elements 51*a* and 52*a* are continuously pushed by the sliding element 61*a*, the first operating portions 512*a* and 522*a* of the two pushing elements 51*a* and 52*a* will push against the first corresponding inclined structures 432*a* and 442*a* of the corresponding moving structures 43*a* and 44*a* through its first inclined structures 5121*a* and 5221*a*. With the dynamic interaction of the inclined structures, the moving structures 43*a* and 44*a* will move horizontally relative to the base 10*a* towards the lateral side away from each other in the direction substantially perpendicular to the movement of the two pushing elements 51*a* and 52*a* (defined as the second predetermined direction) till the first operating portions 512*a* and 522*a* push the moving structures 43*a* and 44*a* to a predetermined position (e.g., when the pushing elements 51*a* and 52*a* move towards the first predetermined direction until they are blocked by the first blocking portion 13*a*, such that the first corresponding inclined structures 432*a* and 442*a* of the moving structures 43*a* and 44*a* move towards the second predetermined direction and pass the first inclined structures 5121*a* and 5221*a* of the first operating portions 512*a* and 522*a*). The first top surfaces 5122*a* or 5222*a* at outermost side of the first operating portions 512*a* or 522*a* will press against the first corresponding top surfaces 434*a* or 444*a* at the innermost side of the moving structures 43*a* and 44*a*. As a result, the moving structures 43*a* and 44*a* will be supported and fixed by the first operating portions 512*a* and 522*a* to resist the elastic recovery caused from each the elastic elements 70 pulling inward, as shown in FIG. 7(*b*). The movement of the moving structures 43*a* and 44*a* will respectively drive the corresponding keyboard portions 41*a* and 42*a* to move and separate from each other such that a gap S1 that allows the sliding element 61*a* to pass through is formed between the two keyboard portions 41*a* and 42*a*. Meanwhile, each elastic element 70 is stretched because the moving structures 43*a* and 44*a* move relative to the base 10*a*. Accordingly the sliding element 61*a* can pass through the interference portions 511*a* and 521*a*, which is similar to the operation of the first embodiment, and continue moving towards the front end 11*a* to present the portable computer 1*a* of the present invention in a tablet state as shown in FIG. 4(*c*) mentioned above.

Conversely, when the user wants to change the tablet state of the portable computer 1a in the present invention in FIG. 4(c) back to the state in FIG. 4(b), through applying an inverse force to the free end of the display module, the sliding element 61a of the sliding assembly 60a slides along the slide corresponding element 62a from the front end 11a of the base 10a to the rear end 12a. While the display module is moving away from the keyboard module 40a, the driving structure 613a of the sliding element 61a will again contact with the interference portions 511a and 521a of the two pushing elements 51a and 52a; through interference between the driving structure 613a and the interference portions 511a and 521a, the two pushing elements 51a and 52a are pushed by the sliding element 61a to move towards the rear end 12a of the base 10a in the direction opposite to the first predetermined direction.

Figure 7C:
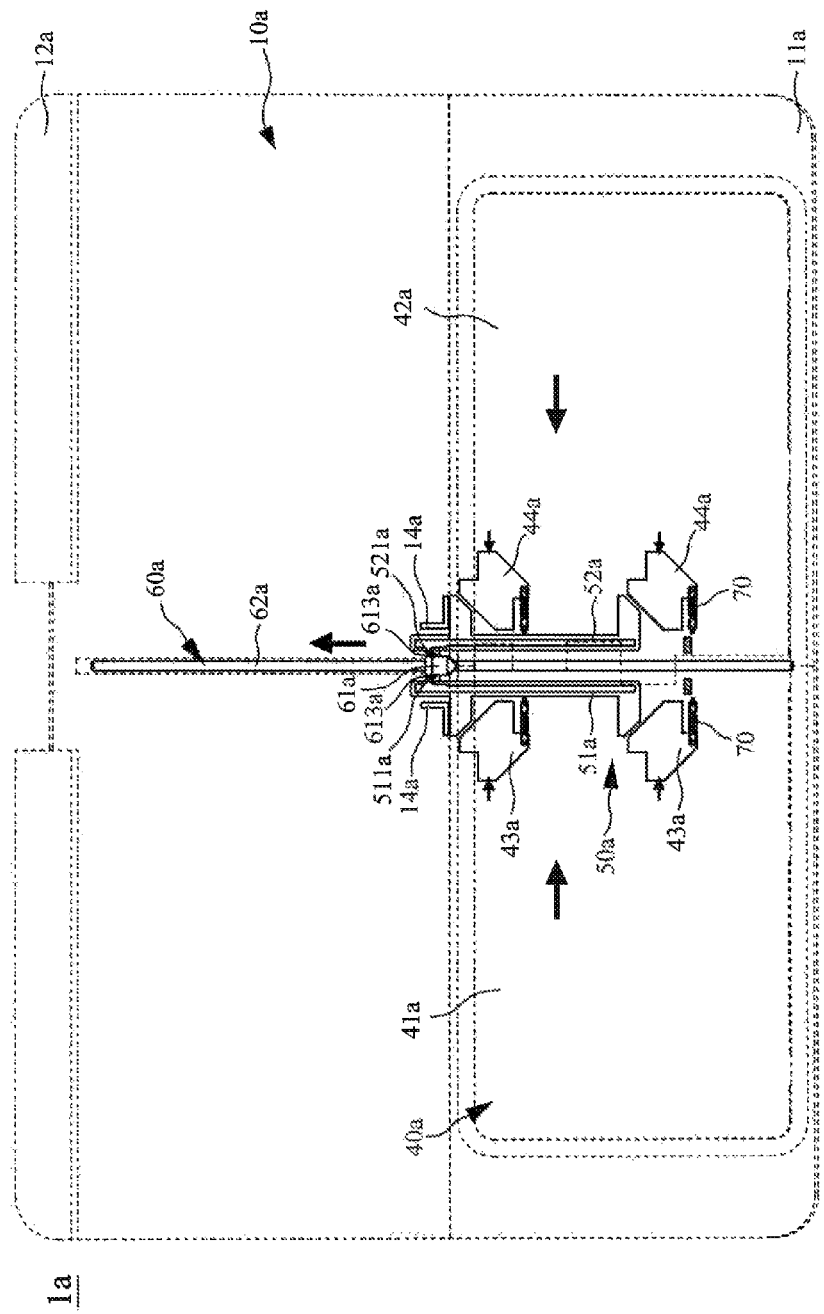
FIG. 7(c) is a view showing the sliding element of the portable computer of the present invention being away from the keyboard module in the second embodiment.

As shown in FIG. 7(c), while the two pushing elements 51a and 52a are continuously being pushed by the sliding element 61a towards the rear end 12a of the base 10a, each of the moving structures 43a and 44a will be away from the support of the first operating portions 512a and 522a of the two pushing elements 51 and 52; that is, the first operating portions 512a and 522a will no longer be acting on the moving structures 43a and 44a, and with the elastic recovery of each elastic element 70, the moving structures 43a and 44a will be moved horizontally relative to the base 10a towards the interior of the base 10a in the direction of the movement substantially perpendicular to the two pushing elements 51a and 52a (the opposite of the second predetermined direction). The movement of the moving structures 43a and 44a will respectively drive the corresponding keyboard portions 41a and 42a to move and be gradually combined with each other until the sliding element 61a passes through the interference portions 511a and 521a and continues moving towards the rear end ii a to be gradually away from the keyboard module 40a; therefore, the portable computer 1a of the present invention will return to the general use state as FIG. 4(b) mentioned above.

Through the design of the present invention, when the user flips the display module relative to the base and gets its connecting end close to the keyboard module, the keyboard module will be automatically separated, and then the sliding element will drive the display module directly through the keyboard module to make the display surface superimposed on the base outwards to present the tablet state. When an inverse operation is performed, the parts of the keyboard module can be combined automatically to be restored to the original state of the keyboard. As such, both sides of the display module are respectively connected to a sliding portion in a conventional similar device; the issue of taking into account the symmetrical balance when both sides of the structure are flipped and moved can be avoided, and the number of the sliding portions to be provided can be decreased, which provides stability and practicality during movement.

As described above, the objectives, means, and effectiveness in the present invention are different from the characteristics in the prior art. It should be noted that the embodiments described above are for illustrating the principles and effects of the present invention, and not for limiting the scope of the present invention. Any person skilled in the art shall be able to make modifications and changes to the embodiments without departing from the technical principle and spirit of the present invention. The claims of the present invention within the scope of protection are described below.

What is claimed is:

1. A portable computer, comprising:
   a base, with a front side and a rear side between a front end and a rear end thereof, having a first area defined at the front side and a second area defined at the rear side;
   a keyboard module, disposed in the first area, comprising two detachable keyboard portions, each of the keyboard portions comprising at least one moving structure by which the keyboard portion is movably combined with the base;
   a pushing assembly, movably combined with the first area of the base, comprising two pushing elements, each of the pushing elements comprising an interference portion and at least one first operating portion, and each of the first operating portions being disposed corresponding to each of the moving structures for driving the moving structure to move towards a second predetermined direction when the pushing element is moved towards a first predetermined direction;
   a display module comprising a connecting end and a display surface;
   at least one supporting element, each of the supporting elements comprising a first fixed end and a second fixed end, the first fixed end being pivotally connected to a portion of the display module other than the display surface for allowing the display module to rotate relative to the supporting element, and the second fixed end being pivotally connected to or close to the rear end of the base for allowing the supporting element to rotate relative to the base; and
   a sliding assembly comprising a sliding element and a slide corresponding element, the slide corresponding element being disposed in the base, and the sliding element being combined with the connecting end of the display module and able to slide along the slide corresponding element, wherein the sliding element comprises a driving structure corresponding to the interference portion;
   whereby, when the connecting end of the display module moves from the second area to the first area relative to the base, with the driving structure of the sliding element pushing the interference portion to move the pushing element towards the first predetermined direction, the first operating portion of the pushing element drives the moving structure to move towards the second predetermined direction, such that the two keyboard portions are separated from each other with a predetermined gap, which allows the driving structure of the sliding element to continuously slide forward along the slide corresponding element once it is departed from the interference structure.

2. The portable computer as claimed in claim 1, wherein the base comprises a first blocking portion for limiting the distance that the pushing assembly can move towards the front end of the base.

3. The portable computer as claimed in claim 2, wherein the base comprises a second blocking portion for limiting the distance that the pushing assembly can be moved towards the rear end of the base.

4. The portable computer as claimed in claim 1, wherein each of the first operating portions comprises a first inclined structure, and each of the moving structures further comprises a first corresponding inclined structure corresponding to the first inclined structure.

5. The portable computer as claimed in claim 1, wherein the first predetermined direction moved by the pushing assembly is substantially perpendicular to the second predetermined direction moved by each of the moving structures.

6. The portable computer as claimed in claim 1, wherein the driving to structure is a set of protruding structure on the outer surface of the sliding element, and the interference portion is a bump structure with elasticity.

7. The portable computer as claimed in claim 1, further comprising a plurality of elastic elements, wherein one end of each elastic element is connected to the base and the opposite end thereof is connected to the moving structure, such that when the first operating portion is no longer acting on the moving structure, the two keyboard portions are driven to be combined with each other through pulling force from each of the elastic elements.

8. The portable computer as claimed in claim 1, wherein each of the pushing elements further comprises at least one second operating portion, each of which is disposed corresponding to each of the moving structures; when the pushing assembly is moving towards the opposite of the first predetermined direction, each second operating portion pushes each moving structure to drive the two keyboard portions to be combined with each other.

9. The portable computer as claimed in claim 8, wherein each of the second operating portions comprises a second inclined structure, and each of the moving structures further comprises a second corresponding inclined structure corresponding to the second inclined structure.

10. The portable computer as claimed in claim 1, wherein each of the pushing elements further comprises a stop groove and the base to further comprises a plurality of stop structures correspondingly accommodated within each of the stop grooves for limiting the direction of movement of the pushing assembly.

11. The portable computer as claimed in claim 1, wherein the slide corresponding element is a rod piece and the sliding element is a sleeve member combined with the rod piece to slide along the rod piece.

12. The portable computer as claimed in claim 1, wherein the slide corresponding element is a slide rail and the sliding element is a slider disposed within the slide rail to slide along the slide rail.

13. The portable computer as claimed in claim 1, wherein the slide corresponding element extends through the first area and the second area, wherein a slit is disposed at the top of the base corresponding to the slide corresponding element, which similarly extends through the first area and the second area, such that the sliding element passes through the slit and combines with the connecting end of the display module.

14. The portable computer as claimed in claim 7, wherein each of the first operating portions further comprises a first top surface at its outermost end and away from the slide corresponding element; each of the moving structures further comprises a first corresponding top surface at its most inner side and close to the slide corresponding element; when the first operating portion pushes the moving structure to a predetermined position, the first top surface is against the first corresponding top surface, such that the moving structure is supported and fixed by the first operating portion to resist the elastic recovery of the elastic element.

* * * * *